(12) United States Patent
Manolakos et al.

(10) Patent No.: US 11,438,113 B2
(45) Date of Patent: Sep. 6, 2022

(54) DELAYED SOUNDING REFERENCE SIGNAL (SRS) TRANSMISSION

(71) Applicant: QUALCOMM Incorporated, San Diego, CA (US)

(72) Inventors: Alexandros Manolakos, San Diego, CA (US); Yi Huang, San Diego, CA (US); Joseph Binamira Soriaga, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 16/859,402

(22) Filed: Apr. 27, 2020

(65) Prior Publication Data

US 2020/0382253 A1    Dec. 3, 2020

(51) Int. Cl.
*H04L 5/00*       (2006.01)
*H04W 72/04*   (2009.01)

(52) U.S. Cl.
CPC ......... *H04L 5/0048* (2013.01); *H04W 72/042* (2013.01); *H04W 72/0446* (2013.01)

(58) Field of Classification Search
CPC .............. H04L 5/0048; H04W 72/042; H04W 72/0446
See application file for complete search history.

(56) References Cited

U.S. PATENT DOCUMENTS

2020/0288436 A1* 9/2020 Byun .................... H04L 5/0091

OTHER PUBLICATIONS

Ericsson: "UL Signals and Channels for NR-U", 3GPP Draft, 3GPP TSG-RAN WG1 Meeting #96, R1-1902882 UL Signals and Channels, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600580, 9 Pages, Retrieved from the Internet: [retrieved on Feb. 16, 2019] URL: http://www.3gpp.org/ftp/tsg%5Fran/WG1%5FRL1/TSGR1%5F96/Docs/R1%2D1902882%2Ezip, Proposal 12, page eighth.
International Search Report and Written Opinion—PCT/US2020/035427—ISAEPO—dated Sep. 14, 2020.
(Continued)

*Primary Examiner* — Duc C Ho
(74) *Attorney, Agent, or Firm* — Qualcomm Incorporated

(57) ABSTRACT

Certain aspects of the present disclosure provide techniques for handling delayed sounding reference signal (SRS) transmission. A user equipment may be configured to receive, from a network, at least one SRS parameter and a first downlink control information (DCI), wherein the first DCI includes a first request for transmission of a first SRS; identify a first slot for transmission of the first SRS based on said at least one SRS parameter and the first DCI; determine that the first slot is not available for transmission of the first SRS; identify a second slot for transmission of the first SRS in response to the determining that the first slot is not available for transmission of the first SRS; determine a maximum SRS delay associated with the first SRS; and determine whether to transmit the first SRS in the second slot based on the maximum SRS delay.

30 Claims, 9 Drawing Sheets

(56) References Cited

OTHER PUBLICATIONS

Oppo: "Remaining Issues on SRS Design", 3GPP Draft, 3GPP TSG RAN WG1 Meeting #93, R1-1806828, 3rd Generation Partnership Project (3GPP), Mobile Competence Centre, 650, Route Des Lucioles, F-06921, Sophia-Antipolis Cedex, France, vol. RAN WG1, No. Busan, Korea; May 21, 2018-May 25, 2018, May 11, 2018 (May 11, 2018), XP051461980, 3 pages, Retrieved from the Internet: URL: http://www.3gpp.org/ftp/tsg%5Fran/WG1%5FRL1/TSGR1%5F93/Docs [retrieved on May 11, 2018] p. 1-p. 3.

* cited by examiner

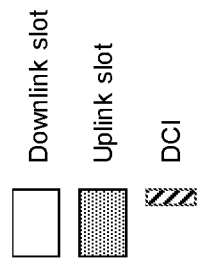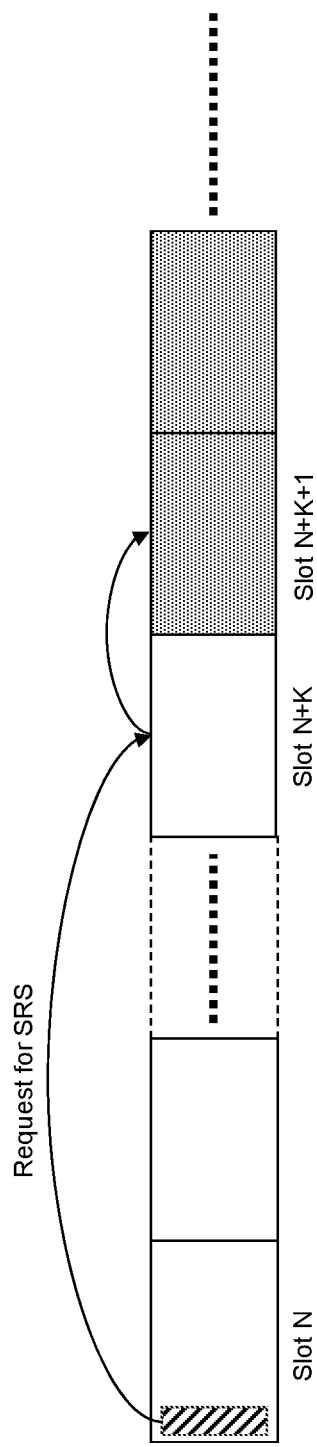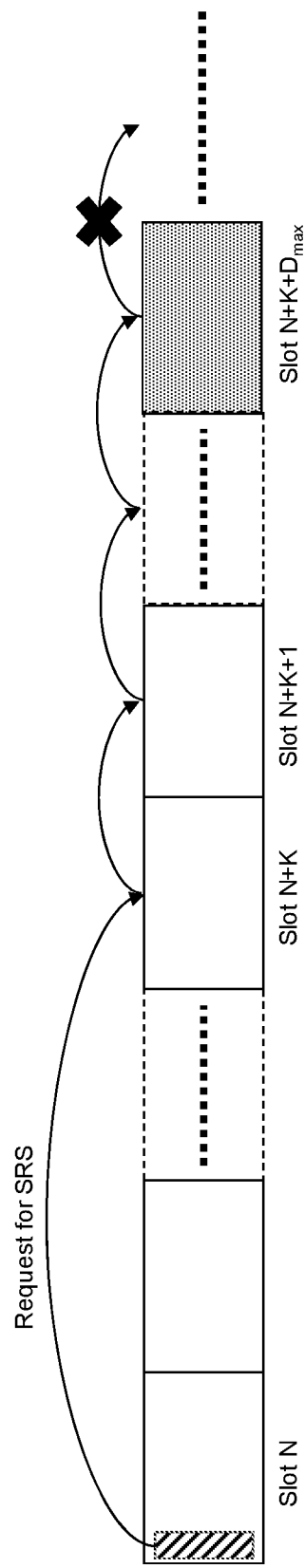
FIG. 7A
FIG. 7B

DELAYED SOUNDING REFERENCE SIGNAL (SRS) TRANSMISSION

CROSS REFERENCES

The present Application for Patent claims priority to Greek Patent Application No. 20190100239, entitled "Delayed Sounding Reference Signal (SRS) Transmission," filed May 31, 2019, assigned to the assignee hereof.

INTRODUCTION

Field of the Disclosure

Aspects of the present disclosure relate to wireless communications, and more particularly, to techniques for delayed sounding reference signal (SRS) transmission.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE) in a network. The method generally includes receiving, from a network, a sounding reference signal (SRS) parameter and a first downlink control information (DCI), wherein the first DCI includes a first request for transmission of a first SRS, determining a first slot for transmission of the first SRS based on the SRS parameter and the first DCI, determining a second slot for transmission of the first SRS if the first slot is not available for transmission of the first SRS, determining whether to transmit the first SRS on the second slot based on a first maximum SRS delay associated with the first SRS, determining not to transmit the first SRS on the second slot if the second slot is after the first maximum SRS delay from the first slot; and transmitting the first SRS on the second slot if the second slot is within the first maximum SRS delay from the first slot.

Certain aspects provide another method for wireless communications by a user equipment (UE) in a network. The method generally includes receiving, from a network, a sounding reference signal (SRS) parameter and a downlink control information (DCI), wherein the first DCI includes a request for transmission of a plurality of SRSs associated with a plurality of component carriers, determining a first slot for transmission of a first SRS associated with a first component carrier based on the SRS parameter and the first DCI, determining a second slot for transmission of the first SRS based at least on an ordering of transmission of the plurality of SRSs if the first slot is not available for transmission of the first SRS, determining whether to transmit the first SRS on the second slot based on a maximum SRS delay associated with the first SRS; and transmitting the first SRS on the second slot if the second slot is within the first maximum SRS delay from the first slot.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 7A and 7B illustrate scheduling and delay of an sounding reference signal (SRS) transmission subject to a maximum SRS delay.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
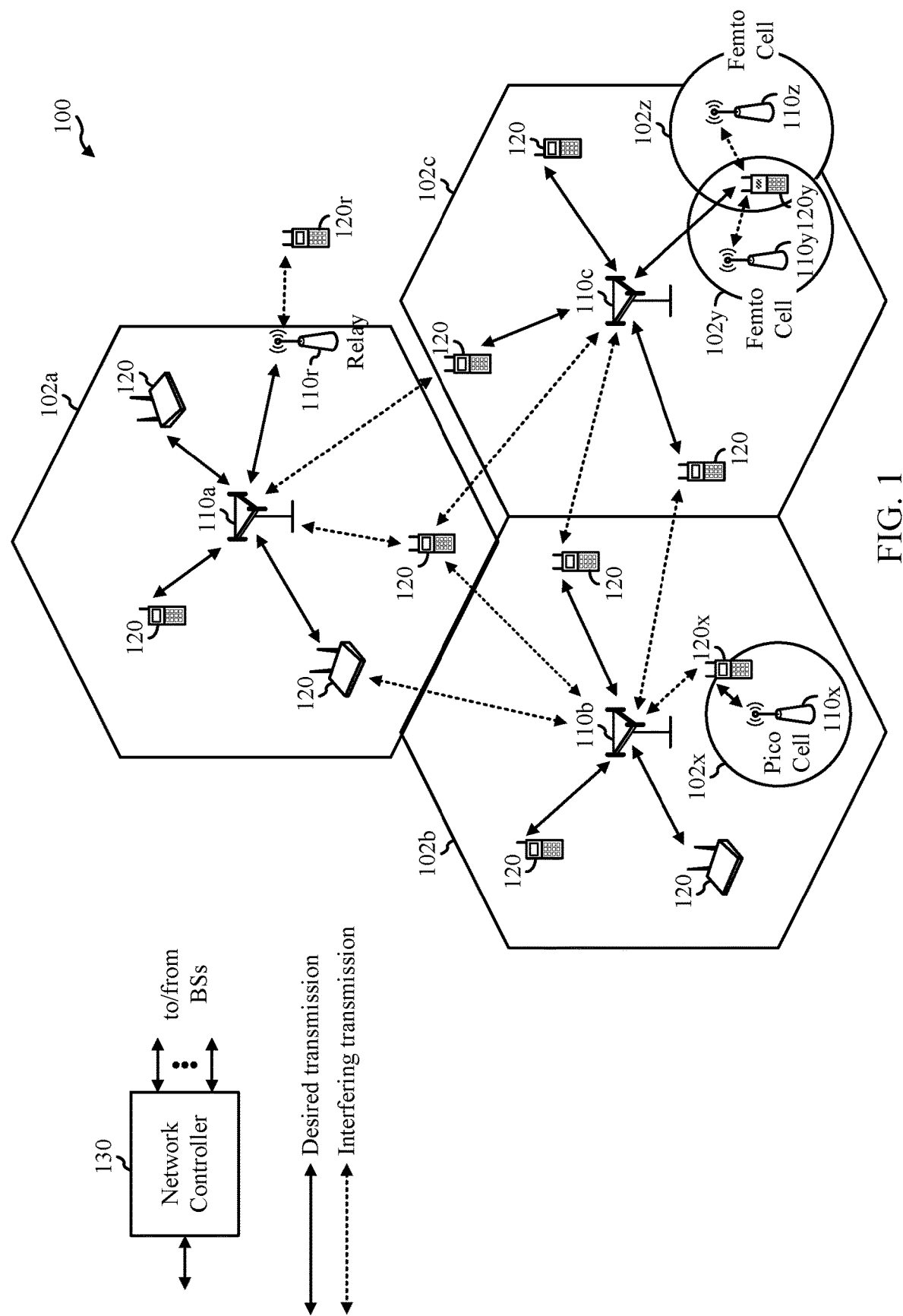
FIG. 1 is a block diagram conceptually illustrating an example telecommunications system, in accordance with certain aspects of the present disclosure.

Aspects of the present disclosure relate to wireless communications, and more particularly, to techniques for handling delayed sounding reference signal (SRS) transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 and network entities (such as BSs 110) may be configured to handle collisions between SRS and PUSCH transmissions using techniques described herein with reference to FIGS. 9 and 10, respectively.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
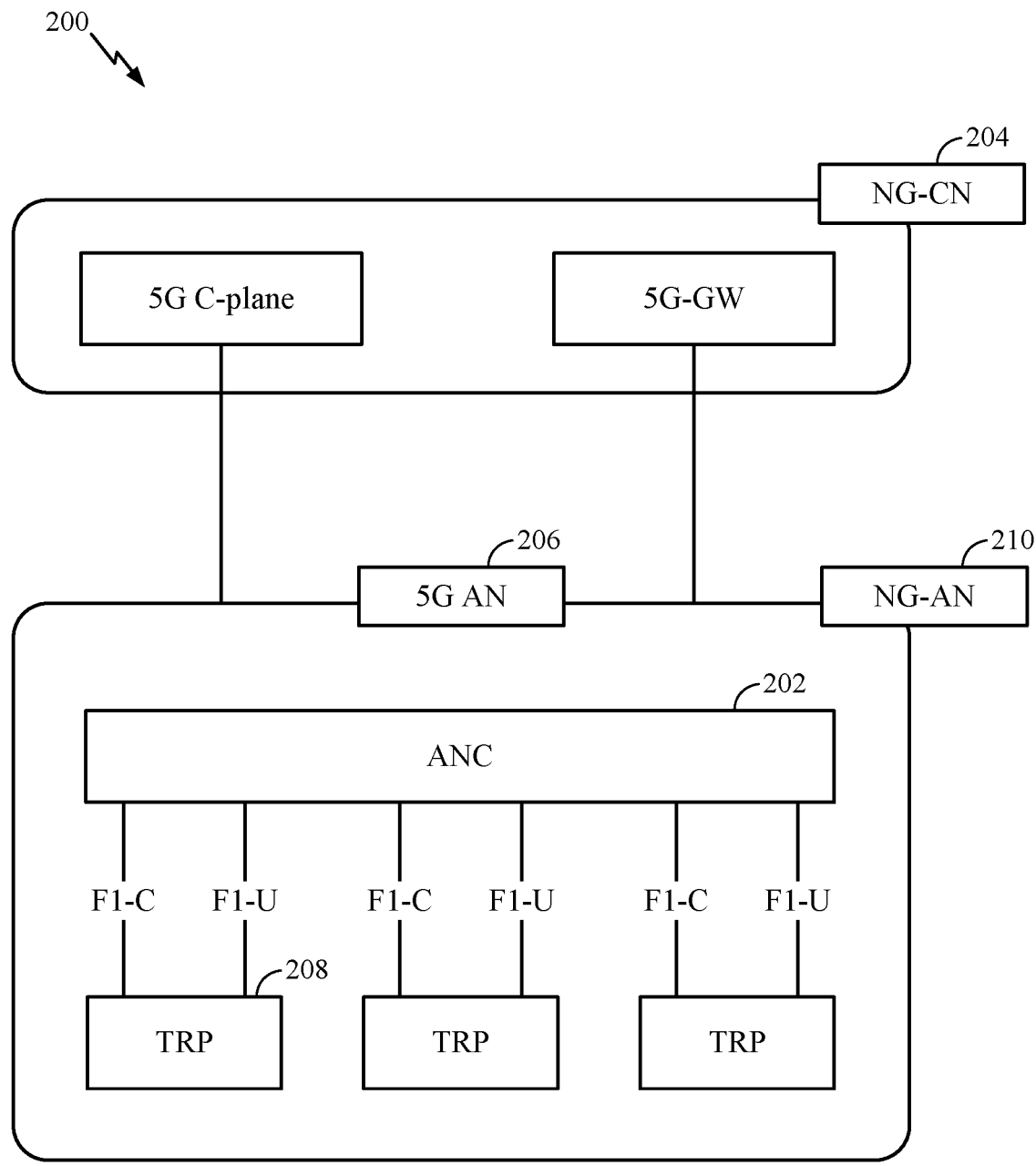
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
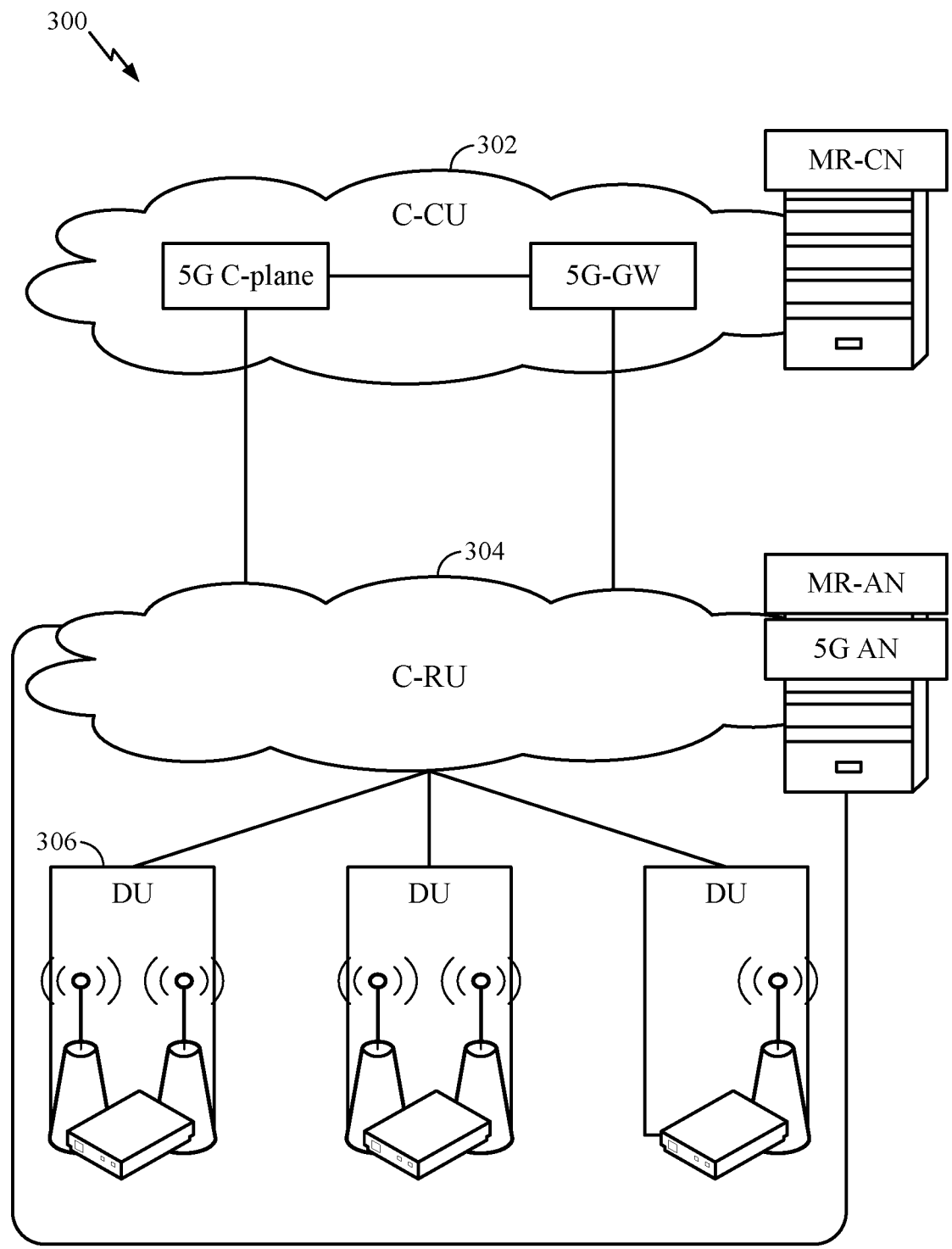
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
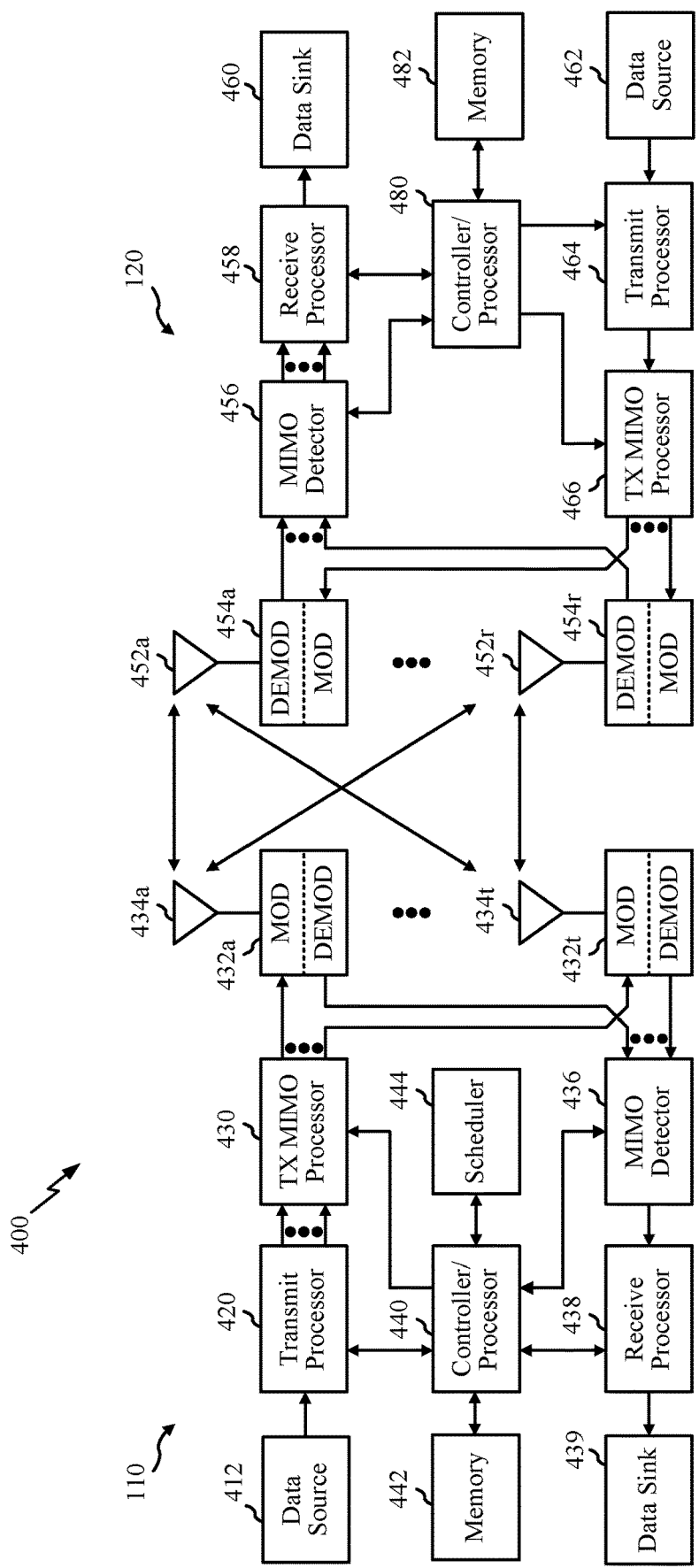
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
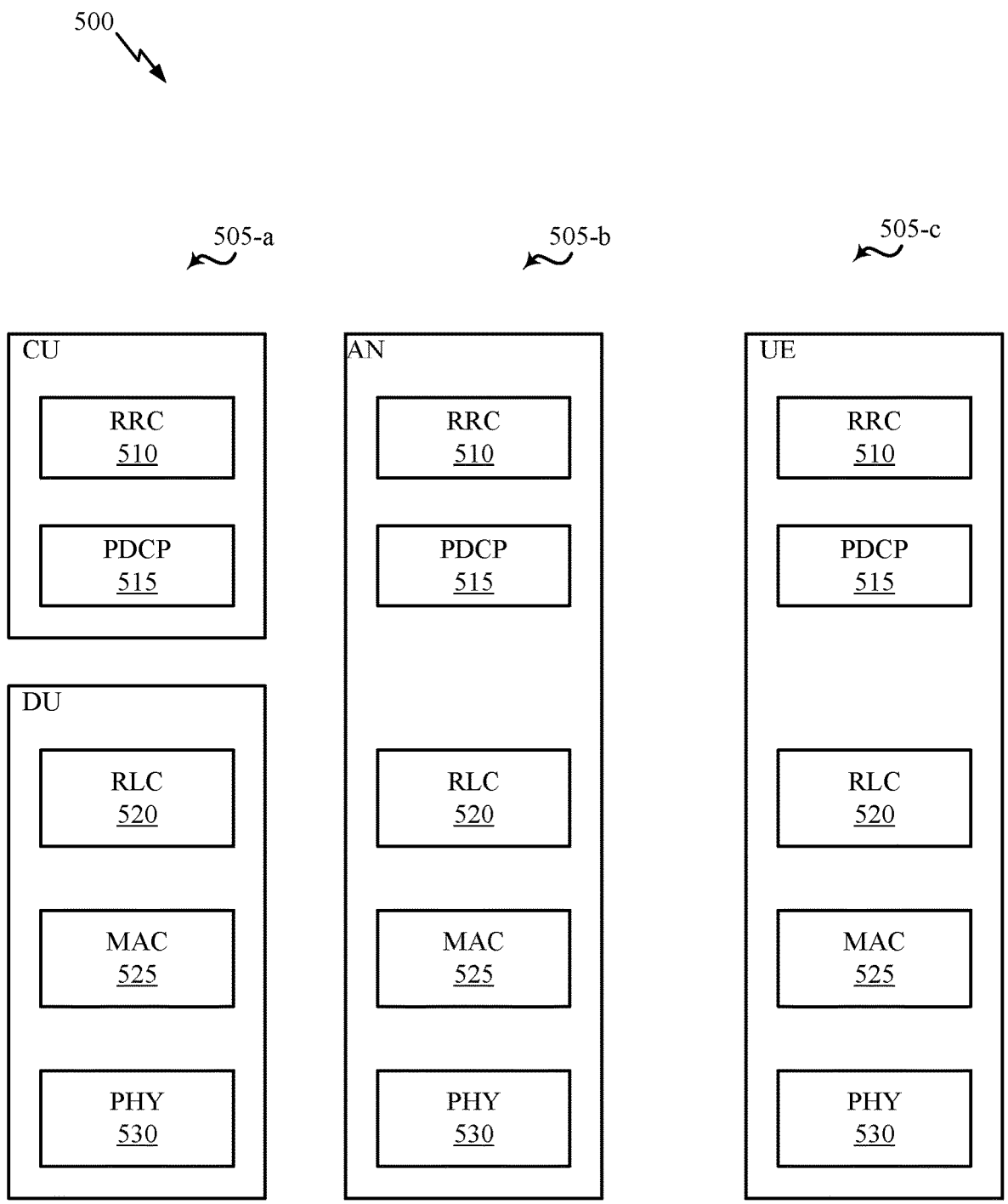
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., a DU such as TRP DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
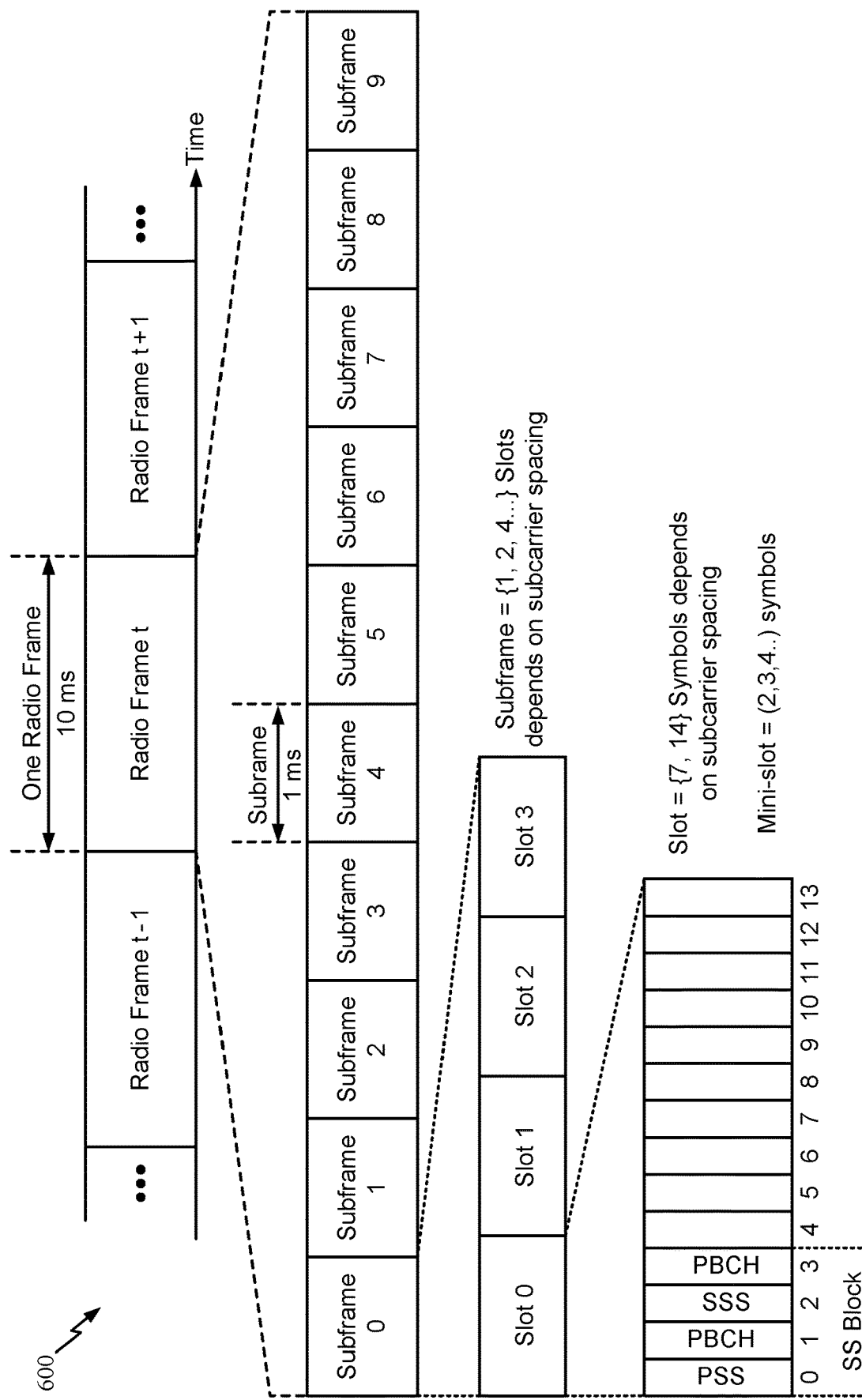
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Delayed Sounding Reference Signal (SRS) Transmission

In wireless communication systems, such as the wireless communication system described above, user equipments (UEs) may transmit sounding reference signals (SRSs) so that the network/base station (e.g., eNBs, gNB, etc.) can measure uplink channel quality. Conventionally, one SRS is transmitted by a UE in a last symbol of a normal uplink subframe. However, more recently, additional symbols have been introduced for transmitting SRSs in a normal uplink (UL) subframe, which may be identified based on a flexible SRS symbol location configuration and/or a virtual cell ID associated with the UE that transmitted the (additional) SRSs. In this context, a "normal subframe" is contrasted with a "special subframe" such as those defined and placed between "normal DL subframes" and "normal UL subframes" that allow a UE to switch between receive and transmit processing.

In some cases, SRS capacity and coverage enhancements have been supported by introducing more than one symbol for SRS on UL normal subframe. This may involve introducing more than one symbol for SRS for one UE or for multiple UEs on a UL normal subframe. As a baseline, a minimum SRS resource allocation granularity for a cell may be one slot (e.g., one of two time slots of a subframe) or a subframe, when more than one symbol in a normal subframe is allocated for SRS for the cell. As noted above, a virtual cell ID may be introduced for SRS, allowing different SRS transmissions to be distinguished.

Additionally, in some cases, intra-subframe frequency hopping and repetition may be supported for aperiodic SRS in the additional SRS symbols of a normal uplink subframe. Intra-subframe frequency hopping for aperiodic SRS transmission may involve transmitting aperiodic SRSs on different frequency bands on a symbol-by-symbol basis in a subframe. Additionally, aperiodic SRS repetition may involve repeating transmission of an aperiodic SRS, transmitted in a first additional symbol of a subframe (e.g., using a first antenna, frequency band, etc.), in a second additional symbol of the subframe.

Further, intra-subframe antenna switching may be supported for aperiodic SRS in the additional SRS symbols. Intra-subframe antenna switching for aperiodic SRS transmission may involve transmitting aperiodic SRSs using different antennas on a symbol-by-symbol basis in a subframe.

SRS resources may span one or more adjacent symbols. For example, NR supports SRS resources that span one, two, or four adjacent symbols with up to four antenna ports per SRS resource. All antenna ports of an SRS resource are used for sounding in each symbol.

SRS transmission may have the following requirements and limitations: an SRS may only be transmitted in the last 6 symbols of a slot; an SRS may only be transmitted after the PUSCH in that slot; an SRS resource set contains a sets of SRS resources transmitted by one UE; SRS transmission may be wideband or subband; and SRS bandwidth may be a multiple of 4 PRBs.

An SRS may be transmitted aperiodically (DCI-signaled), semi-persistently, or periodically. A UE may be configured with multiple resources, which may be grouped in a SRS resource set depending on the use case (antenna switching, codebook-based, non-codebook based, or beam management).

An aperiodic SRS may be triggered by a request signal in the downlink channel. For example, an SRS request may be sent by the network within DCI through the physical downlink control channel. Once the SRS request is received by the UE, UE may schedule the SRS transmission based on various SRS parameters including a slot offset parameter. For example, the UE may schedule the SRS transmission after a certain slot offset (K) from the slot in which the UE received the DCI with the SRS request. The slot offset K may be configured through RRC message from the network and may be configured for each SRS resource set.

If all the symbols of the slot scheduled to transmit the SRS are not available for SRS transmission, the transmission of the SRS may be delayed to a later slot. A symbol within a slot may not be available for SRS transmission if, for example, the symbol is for downlink transmission (e.g., the UE is receiving data), the symbol is for flexible transmission where a downlink physical channel has been triggered to be transmitted, there is another higher priority UL channel that is scheduled during the symbol, and/or the UE is receiving signalling (e.g., RRC, DCI, UL cancelling indication, etc.) such that the symbol is not available for SRS. The maximum SRS delay, by which the SRS transmission is delayed from the originally scheduled slot, may be set in various manners, after which the SRS is considered dropped (i.e., not transmitted).

FIG. 7A illustrates scheduling and delay of an SRS transmission triggered by a request signal within DCI through the physical downlink control channel. For example, at slot N, the UE may receive DCI which includes an SRS request parameter. Once the UE identifies the SRS request, the UE may schedule the SRS transmission at a later slot based on a slot offset (K) parameter, e.g., the SRS transmission is scheduled at slot N+K. If, however, slot N+K is not available for SRS transmission, the SRS transmission is delayed by one or more slots (D). In FIG. 7A, for example, the SRS transmission is delayed by one slot, e.g., the SRS transmission is delayed to slot N+K+1 since slot N+K is not available for SRS transmission.

FIG. 7B illustrates scheduling and delay of an SRS transmission subject to a maximum SRS delay. For example, when the SRS transmission is delayed to a later slot, the delay (D) may not be more than a certain maximum delay ($D_{max}$). If the delay is more than the maximum delay, the SRS transmission may be dropped entirely. In FIG. 7B, for example, the delayed SRS may not be transmitted after slot $N+K+D_{max}$.

There are various ways to set the maximum SRS delay, for example:

The maximum SRS delay may be a fixed number of slots independent of the system numerologies (i.e., system bandwidth, subcarrier spacing, cyclic prefix length, etc.).

The maximum SRS delay may be a fixed time duration, for example, in milliseconds (msec).

The maximum SRS delay may depend on the system numerology (e.g., subcarrier spacing). Here, different value for each system numerology is specified. For example, the maximum SRS delay value may be 5 slots for 15 kHz subcarrier but may be 10 slots for 30 kHz subcarrier.

The maximum SRS delay may depend on a use-case, usage and/or purpose of a SRS resource set. A UE may be configured with multiple resources, which may be grouped in a SRS resource set depending on the use case (antenna switching, codebook-based, non-codebook based, and beam management). For each use-case, the maximum SRS delay may be different.

The maximum SRS delay may be configurable for each SRS resource set, and it may be configured by a configuration parameter in the radio resource control (RRC) protocol level. The SRS resource set may be determined from the received DCI.

Figure 8:
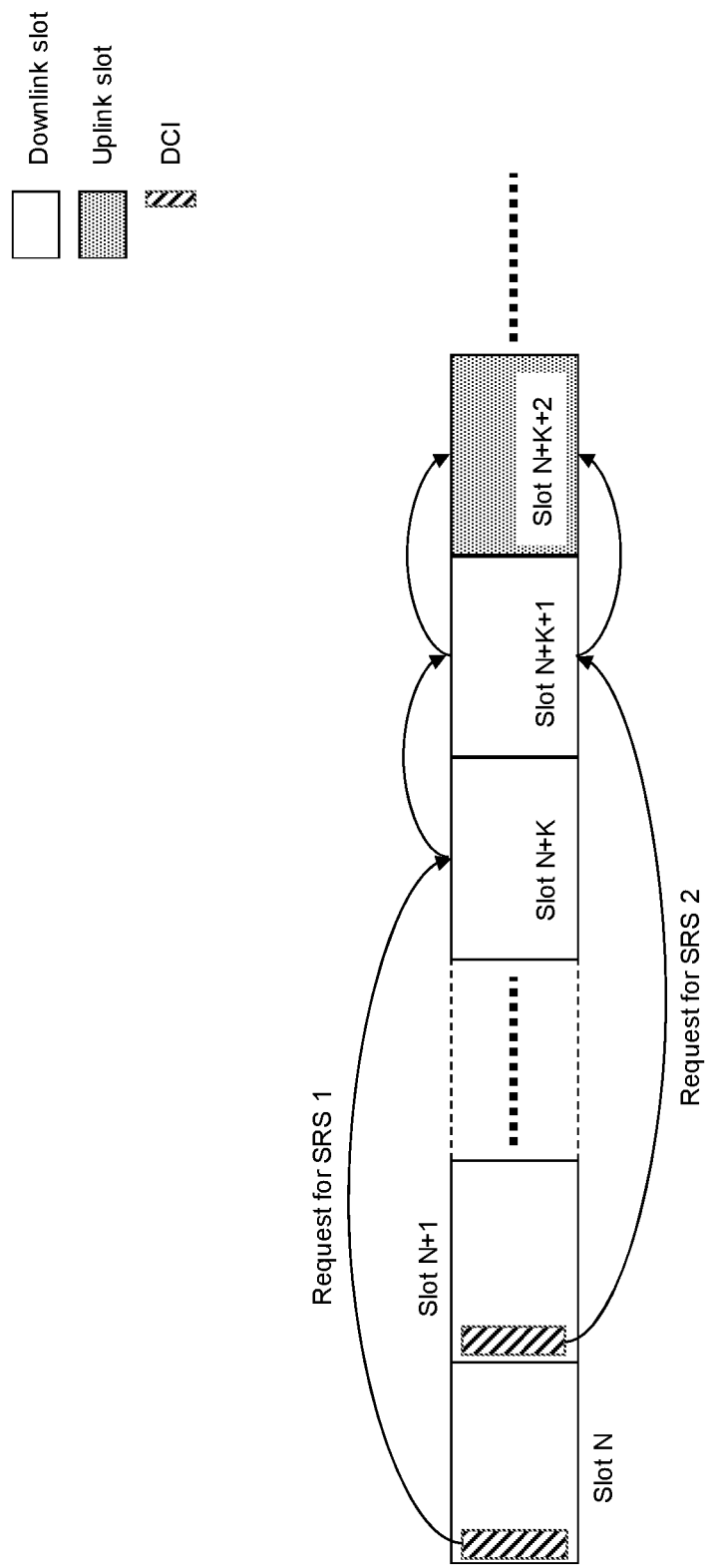
FIG. 8 illustrates scheduling and delay of SRS transmissions when there are multiple delayed SRS transmissions which may collide.

FIG. 8 illustrates scheduling and delay of SRS transmissions when there are multiple delayed SRS transmissions which may collide. If the same or different aperiodic SRS resource sets have been triggered in different DCIs (e.g., UL DCI, DL DCI, group common DCI) and the first opportunity for the transmission of the multiple triggered occasions collide on the same slot, the following options may be considered:

Option 1: The SRS occasion with the smallest delay (D) is prioritized.

Option 2: The SRS occasion with the largest delay (D) is prioritized.

Option 3: All delayed SRSs are dropped.

Option 4: If the delay is the same, then the SRS that was triggered with the latest DCI is prioritized. In this case, the "latest DCI" could be the one which belongs in a control region with the latest first symbol.

Option 5: The UE does not expect such multiple triggering to occur.

In FIG. 8, for example, the UE may receive a DCI with an SRS request at slot N (SRS 1) and then receive another DCI with an SRS request at slot N+1 (SRS 2). Since both scheduled slots for SRS transmissions (slot N+K and slot N+K+1, respectively) are not available, both SRS transmissions are delayed to slot N+K+2. According to Option 1, only SRS 2 is transmitted (SRS 1 is dropped, i.e., not transmitted). According to Option 2, only SRS 1 is transmitted (SRS 2 dropped). According to Option 3, both SRS 1 and SRS 2 are dropped.

In carrier aggregation (CA) scenarios, the UE may be configured with a set of carrier components (CCs) to transmit for carrier switching. With one grant in the DCI, a sequence of SRS transmissions are triggered for each CC. If an aperiodic SRS resource is delayed for a specific CC, then the following options may be considered:

Option 1: All the upcoming SRS transmission for the remaining CCs are delayed so that the sounding ordering of the CCs does not change.

Option 2: The delayed SRS moves in the end of the sounding CC list.

Option 3: The delayed SRS takes the place of the SRS for the next CC, and so on, thus the SRS for the last CC in the sounding CC list is dropped if it goes beyond the maximum delayed slot.

Option 4: For SRS triggered with DCI format 2_3 and TypeB, the delayed SRS is not possible. In this case, the SRS is not delayed.

For example, there may be 3 SRS transmissions for 3 CCs (SRS 1, SRS 2, and SRS 3) triggered by a grant in DCI with the sounding order of {SRS 1, SRS 2, SRS 3}. If the SRS 2 is delayed due to unavailability of the UL slot in the originally scheduled slot, according to Option 1, SRS 2 is delayed to the next available slot and SRS 3 is also delayed so that it is transmitted after the delayed SRS 2 (or, may be dropped if it is delayed beyond the maximum SRS delayed slot). According to Option 2, SRS 3 may be transmitted on the originally scheduled slot, and then the delayed SRS 2 is scheduled after the transmission of SRS 3 (or, may be dropped if it is delayed beyond the maximum SRS delayed slot). According to Option 3, the delayed SRS 2 may be scheduled to the slot originally scheduled for SRS 3, and SRS 3 may be delayed to the next available slot (or, may be dropped if it is delayed beyond the maximum SRS delayed slot).

Figure 9:
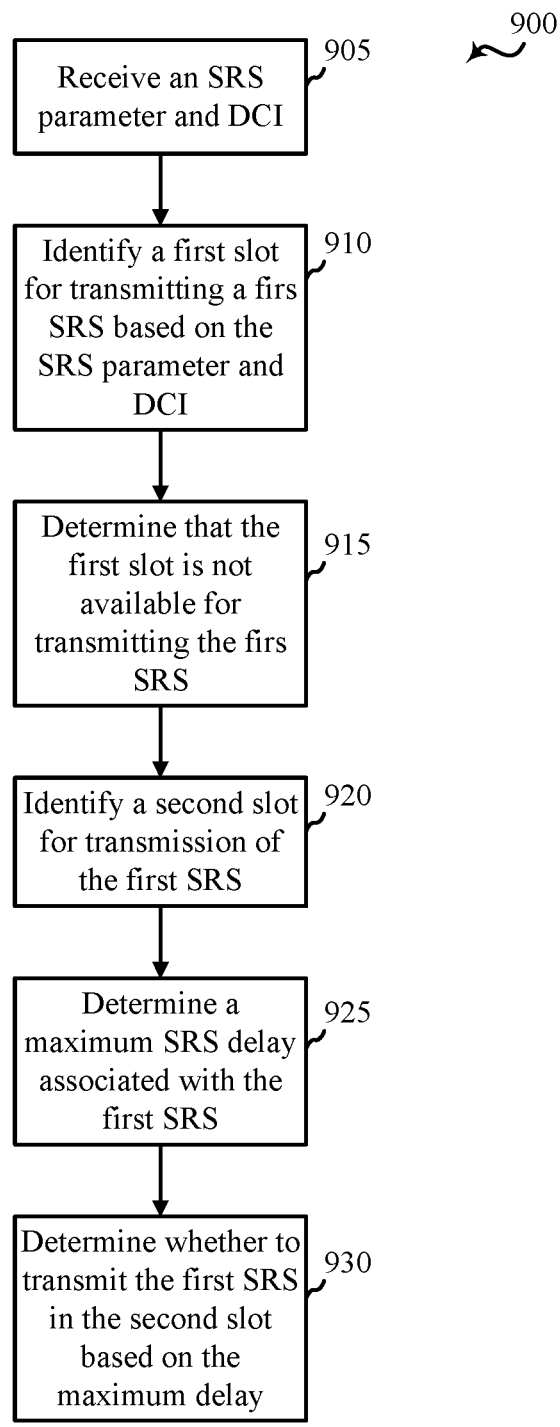
FIG. 9 is a flowchart illustrating a method operable by a UE for SRS transmissions according to one or more aspects.

FIG. 9 is a flowchart of a method 900 of wireless communication. The method may be performed by a UE (e.g., UE 120). The method may improve communications with respect to SRS transmission delays. At 905, the UE receives, from a network, at least one SRS parameter and a DCI. The DCI may include a first request for transmission of an SRS.

At 910, the UE identifies (or determines) a first slot for transmission of the SRS based on the SRS parameter and the DCI. At 915, the UE determines that the first slot is not available for transmission of the SRS. At 920, the UE identifies (or determines) a second slot for transmission of the SRS in response to determining that the first slot is not available for transmission of the SRS. At 925, the UE determines a maximum SRS delay associated with the SRS. At 930, the UE determines whether to transmit the SRS in the second slot based on the maximum SRS delay. In one aspect, the UE determines not to transmit the SRS in the second slot in response to the second slot being after the first slot by more than the maximum SRS delay. In one aspect, the UE determines to transmit, and transmits, the SRS in the second slot in response to the second slot being within the maximum SRS delay from the first slot.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the terms "determining" and "identifying" encompass a wide variety of actions. For example, "determining" and "identifying" may include calculating, computing, processing, deriving, investigating, looking up (e.g., looking up in a table, a database or another data structure), ascertaining and the like. Also, "determining" and "identifying" may include receiving (e.g., receiving information), accessing (e.g., accessing data in a memory) and the like. Also, "determining" and "identifying" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a user equipment (UE), comprising:
   receiving, from a network, at least one sounding reference signal (SRS) parameter and a first downlink control information (DCI), wherein the first DCI includes a first request for transmission of a first SRS;
   identifying a first slot for transmission of the first SRS based on said at least one SRS parameter and the first DCI;
   determining that the first slot is not available for transmission of the first SRS;
   identifying a second slot for transmission of the first SRS in response to the determining that the first slot is not available for transmission of the first SRS;
   determining a maximum SRS delay associated with the first SRS; and
   determining whether to transmit the first SRS in the second slot based on the maximum SRS delay.

2. The method of claim 1, further comprising determining not to transmit the first SRS in the second slot in response to the second slot being after the first slot by more than the maximum SRS delay.

3. The method of claim 1, further comprising transmitting the first SRS in the second slot in response to the second slot being within the maximum SRS delay from the first slot.

4. The method of claim 1, wherein:
   the maximum SRS delay is a fixed number of slots.

5. The method of claim 1, wherein:
   the maximum SRS delay is a fixed time duration.

6. The method of claim 1, wherein:
   the maximum SRS delay is based on a subcarrier spacing.

7. The method of claim 1, wherein:
   the maximum SRS delay is based on an SRS resource set configured in a radio resource control (RRC) protocol level, wherein the SRS resource set is determined based on the first DCI.

8. The method of claim 1, wherein:
   the maximum SRS delay is based on a use-case of an SRS resource set.

9. The method of claim 1, wherein:
   the maximum SRS delay is based on a maximum across multiple configured slot offsets associated with SRS resource sets configured to the UE.

10. The method of claim 1, further comprising receiving a configuration of the maximum SRS delay in a radio resource control message, wherein the determining the maximum SRS delay is based on the received configuration.

11. The method of claim 1, further comprising:
    receiving, from the network, a second DCI, wherein the second DCI includes a second request for transmission of a second SRS;
    determining a third slot for transmission of the second SRS based on the SRS parameter and the second DCI;
    determining that the third slot is not available for transmission of the second SRS;
    determining a fourth slot for transmission of the second SRS in response to the determining that the third slot is not available for transmission of the second SRS;
    determining that the fourth slot is the same as the second slot; and
    in response to determining that the fourth slot is the same as the second slot, determining whether to transmit the first SRS or the second SRS based on locations of the first slot and the third slot, locations of the first DCI and the second DCI, or locations of the first slot, the third slot, the first DCI and the second DCI.

12. The method of claim 11, further comprising: transmitting the first SRS in the second slot in response to the first slot being earlier than the third slot.

13. The method of claim 11, further comprising: transmitting the first SRS in the second slot in response to the third slot being earlier than the first slot.

14. The method of claim 11, further comprising: transmitting the first SRS in the second slot in response to the first DCI being received after the second DCI is received.

15. The method of claim 11, further comprising: transmitting the first SRS in the second slot further if the first slot is the same as the third slot and the first DCI is received after the second DCI is received.

16. The method of claim 1, wherein: the first DCI includes a request for transmission of a plurality of SRSs, including the first SRS, associated with a plurality of component carriers; and the identifying of the second slot for transmission of the first SRS is based at least on an ordering of transmission of the plurality of SRSs.

17. The method of claim 16, further comprising: transmitting the first SRS according to the ordering of transmission of the plurality of SRSs based on the first DCI; and transmitting other SRSs among the plurality of SRSs according to the ordering.

18. The method of claim 16, further comprising transmitting the first SRS after transmission of other SRSs among the plurality of SRSs.

19. The method of claim 16, further comprising transmitting the first SRS before transmission of remaining SRSs among the plurality of SRSs.

20. A user equipment (UE) for wireless communication, comprising:
a processor;
memory coupled to the processor; and
instructions stored in the memory and operable, when executed by the processor, to cause the UE to:
receive, from a network, at least one sounding reference signal (SRS) parameter and a first downlink control information (DCI), wherein the first DCI includes a first request for transmission of a first SRS;
identify a first slot for transmission of the first SRS based on said at least one SRS parameter and the first DCI;
determine that the first slot is not available for transmission of the first SRS;
identify a second slot for transmission of the first SRS in response to the determining that the first slot is not available for transmission of the first SRS;
determine a maximum SRS delay associated with the first SRS; and
determine whether to transmit the first SRS in the second slot based on the maximum SRS delay.

21. The UE of claim 20, wherein the instructions are further operable, when executed by the processor, to cause the UE to determine not to transmit the first SRS in the second slot in response to the second slot being after the first slot by more than the maximum SRS delay.

22. The UE of claim 20, wherein the instructions are further operable, when executed by the processor, to cause the UE to transmit the first SRS in the second slot in response to the second slot being within the maximum SRS delay from the first slot.

23. The UE of claim 20, wherein the maximum SRS delay is:
a fixed number of slots,
a fixed time duration,
based on a subcarrier spacing,
based on an SRS resource set configured in a radio resource control protocol level,
based on a use-case of the SRS resource set,
based on a maximum across multiple configured slot offsets associated with resource sets configured to the UE, or
a combination thereof.

24. The UE of claim 20, wherein the instructions are further operable, when executed by the processor, to cause the UE to receive a configuration of the maximum SRS delay in a radio resource control message, wherein the determining the maximum SRS delay is based on the received configuration.

25. The UE of claim 20, wherein the instructions are further operable, when executed by the processor, to cause the UE to:
receive, from the network, a second DCI, wherein the second DCI includes a second request for transmission of a second SRS;
determine a third slot for transmission of the second SRS based on the SRS parameter and the second DCI;
determine that the third slot is not available for transmission of the second SRS;
determine a fourth slot for transmission of the second SRS in response to the determining that the third slot is not available for transmission of the second SRS;
determine that the fourth slot is the same as the second slot; and
in response to a determination that the fourth slot is the same as the second slot, determine whether to transmit the first SRS or the second SRS based on locations of the first slot and the third slot, locations of the first DCI and the second DCI, or locations of the first slot, the third slot, the first DCI and the second DCI.

26. The UE of claim 25, wherein the instructions are further operable, when executed by the processor, to cause the UE to:
transmit the first SRS on the second slot in response to the first slot being earlier than the third slot;
transmit the first SRS on the second slot in response to the third slot being earlier than the first slot;
transmit the first SRS on the second slot in response to the first DCI being received after the second DCI is received; or
transmit the first SRS on the second slot further if the first slot is the same as the third slot and the first DCI is received after the second DCI is received.

27. The UE of claim 20, wherein:
the first DCI includes a request for transmission of a plurality of SRSs, including the first SRS, associated with a plurality of component carriers; and
an identification of the second slot for transmission of the first SRS is based at least on an ordering of transmission of the plurality of SRSs.

28. The UE of claim 27, wherein the instructions are further operable, when executed by the processor, to cause the UE to:
transmit the first SRS according to the ordering of transmission of the plurality of SRSs based on the first DCI;

transmit other SRSs among the plurality of SRSs according to the ordering;
transmit the first SRS after transmission of the other SRSs; or
transmit the first SRS before transmission of the other SRSs.

29. An apparatus for wireless communication, comprising:
means for receiving, from a network, at least one sounding reference signal (SRS) parameter and a first downlink control information (DCI), wherein the first DCI includes a first request for transmission of a first SRS;
means for identifying a first slot for transmission of the first SRS based on said at least one SRS parameter and the first DCI;
means for determining that the first slot is not available for transmission of the first SRS;
means for identifying a second slot for transmission of the first SRS in response to a determination that the first slot is not available for transmission of the first SRS;
means for determining a maximum SRS delay associated with the first SRS; and
means for determining whether to transmit the first SRS in the second slot based on the maximum SRS delay.

30. A non-transitory computer readable medium storing code for wireless communication, the code comprising instructions executable by a processor to:
receive, from a network, at least one sounding reference signal (SRS) parameter and a first downlink control information (DCI), wherein the first DCI includes a first request for transmission of a first SRS;
identify a first slot for transmission of the first SRS based on said at least one SRS parameter and the first DCI;
determine that the first slot is not available for transmission of the first SRS;
identify a second slot for transmission of the first SRS in response to a determination that the first slot is not available for transmission of the first SRS;
determine a maximum SRS delay associated with the first SRS; and
determine whether to transmit the first SRS in the second slot based on the maximum SRS delay.

* * * * *